US010393903B2

(12) United States Patent
Jin et al.

(10) Patent No.: US 10,393,903 B2
(45) Date of Patent: Aug. 27, 2019

(54) ACOUSTIC LOGGING TOOL UTILIZING FUNDAMENTAL RESONANCE

(71) Applicant: Halliburton Energy Services, Inc., Houston, TX (US)

(72) Inventors: Jing Jin, Singapore (SG); Chung Chang, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 322 days.

(21) Appl. No.: 15/317,071

(22) PCT Filed: Oct. 6, 2015

(86) PCT No.: PCT/US2015/054240
§ 371 (c)(1),
(2) Date: Dec. 7, 2016

(87) PCT Pub. No.: WO2017/061991
PCT Pub. Date: Apr. 13, 2017

(65) Prior Publication Data
US 2017/0285205 A1 Oct. 5, 2017

(51) Int. Cl.
*G01V 1/02* (2006.01)
*G01V 1/52* (2006.01)
(Continued)

(52) U.S. Cl.
CPC ................ *G01V 1/44* (2013.01); *G01V 1/159* (2013.01); *G01V 1/18* (2013.01); *G01V 1/52* (2013.01);
(Continued)

(58) Field of Classification Search
CPC . G01V 1/159; G01V 1/02; G01V 1/40; G01V 1/44; G01V 1/52
See application file for complete search history.

(56) References Cited

U.S. PATENT DOCUMENTS 2,868,311 A * 1/1959 Tullos ...................... G01V 1/52 181/104
2,894,597 A * 7/1959 Kean ........................ G01V 1/52 181/106
(Continued)

FOREIGN PATENT DOCUMENTS

EP 0246773 A2 11/1987
EP 0438307 B1 12/1993
(Continued)

OTHER PUBLICATIONS

International Search Report dated Jun. 29, 2016 for PCT Application No. PCT/US2015/054240 filed on Oct. 6, 2015. 17 pages.

*Primary Examiner* — Edgardo San Martin
(74) *Attorney, Agent, or Firm* — Chamberlain Hrdlicka

(57) ABSTRACT

An acoustic logging tool includes a support structure and a set of acoustic transducers coupled to the support structure. The set of acoustic transducers includes a first acoustic transducer and a second acoustic transducer facing the same direction. Each of the first and second acoustic transducers includes a substrate having a first end, a second end, a first side, and a second side. Each acoustic transduce further includes a first piezoelectric element coupled to the first side of the substrate and a second piezoelectric element coupled to the second side of the substrate. The first and second ends of the substrate extend beyond the first and second piezoelectric elements and are fixed to the support structure.

18 Claims, 3 Drawing Sheets

(51) Int. Cl.
*G01V 1/40* (2006.01)
*G01V 1/44* (2006.01)
*G01V 1/18* (2006.01)

(52) U.S. Cl.
CPC ................ *G01V 2210/1299* (2013.01); *G01V 2210/1429* (2013.01)

(56) References Cited

U.S. PATENT DOCUMENTS 3,360,664 A * 12/1967 Straube ................. B06B 1/0603 307/400
4,140,936 A * 2/1979 Bullock .............. H01L 41/0933 310/328
4,516,228 A 5/1985 Zemanek
4,774,693 A * 9/1988 Winbow .................. G01V 1/44 367/27
4,782,910 A * 11/1988 Sims ..................... B06B 1/0603 181/106
4,899,844 A * 2/1990 Katahara ................ G01V 1/005 181/106
4,949,316 A * 8/1990 Katahara ................ G01H 11/06 310/334
5,109,698 A * 5/1992 Owen ....................... B06B 3/00 166/249
5,343,001 A * 8/1994 Cowles .................... G01V 1/52 181/102
6,437,485 B1 8/2002 Uppsala
6,474,439 B1 * 11/2002 Hoyle ...................... G01V 1/52 181/102
6,568,486 B1 * 5/2003 George .................... G01V 1/44 175/45
7,460,435 B2 * 12/2008 Garcia-Osuna .......... G01V 1/52 367/25
7,471,591 B2 * 12/2008 Tello ........................ G01V 1/44 367/25
8,080,920 B2 12/2011 Andosca et al.
8,199,609 B2 * 6/2012 Ounadjela ................ G01V 1/40 367/157
8,659,211 B1 2/2014 Butler et al.
9,506,946 B2 * 11/2016 Ocak ..................... G01P 15/125
9,541,657 B2 * 1/2017 Mandal ............... H01L 41/0933
9,757,770 B2 * 9/2017 Chang ................... E21B 47/101
9,842,581 B2 * 12/2017 Mayor ................... G01V 1/159
2005/0152219 A1 7/2005 Garcia-Osuna et al.
2008/0079331 A1 * 4/2008 Butler ................... B06B 1/0603 310/331
2009/0129203 A1 5/2009 Jones et al.
2010/0020638 A1 1/2010 Mickael et al.
2013/0242702 A1 9/2013 Onishi
2013/0247662 A1 * 9/2013 Jin ...................... G01P 15/0922 73/504.03
2014/0056111 A1 * 2/2014 Vu ...................... E21B 47/0005 367/180
2016/0072040 A1 * 3/2016 Fripp .................... B06B 1/0215 73/152.47
2016/0288167 A1 * 10/2016 Jin ........................... G01V 1/46
2017/0276819 A1 * 9/2017 Chang ................... B06B 1/0622

FOREIGN PATENT DOCUMENTS

JP 6010525 B2 * 10/2016 ........... H01L 41/257
WO 2015047369 A1 4/2015

* cited by examiner

ACOUSTIC LOGGING TOOL UTILIZING FUNDAMENTAL RESONANCE

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

Acoustic logging operations are used to collect data regarding the rock formation around a wellbore. Typically, an acoustic logging tool in the form of a wireline tool or logging while drilling tool is positioned within the wellbore to collect this data. The acoustic logging tool emits one or more acoustic signals in multiple directions at the surrounding wellbore wall or formation. The acoustic signal travels through the formation and returns to the logging tool having been altered by the formation. As different characteristics of the formation alter the signal differently, the returning signal carries data regarding the characteristics of the formation. Thus, by processing and analyzing the returning signal, the formation characteristics can be obtained.

Acoustic logging tools generally utilize an acoustic source such as an acoustic transducer, which produces an acoustic output. Depending on the parameters of the logging operation, it may be desired for the acoustic output to have a strong output at certain frequencies or over a certain frequency range.

BRIEF DESCRIPTION OF THE DRAWINGS

Illustrative embodiments of the present disclosure are described in detail below with reference to the attached drawing figures, which are incorporated by reference herein and wherein.

Figure 1:
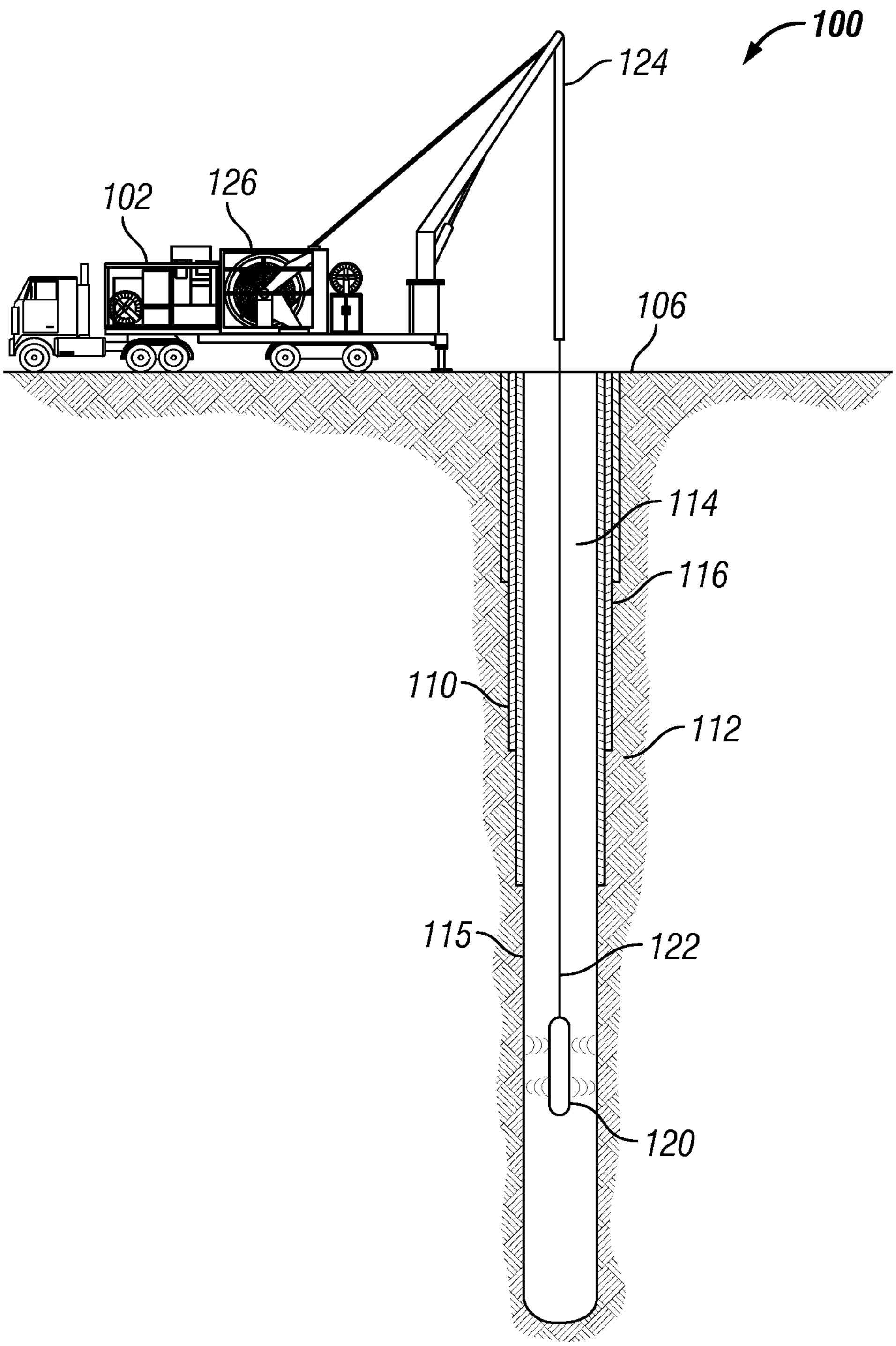
FIG. 1 is a simplified illustration of an acoustic logging operation, in accordance with example embodiments of the present disclosure.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

The following discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but are the same structure or function.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

The present disclosure is directed towards an acoustic logging device which utilizes dual acoustic transducers to increase the acoustic output pressure at certain frequencies.

Referring to the drawings, FIG. 1 is a schematic illustration of an acoustic logging operation 100, in accordance with example embodiments of the present disclosure. An acoustic logging operation 100 is conducted to obtain certain characteristics of a well 114. The well 114 is formed from a surface well site 106 through one or more formations 112. The well 114 may include a wellbore 115 which is at least partially defined by a casing string 110. Lower parts of the wellbore 115 may be left uncased and described as "open hole". In certain example embodiments, production fluids may enter the well 114 from the surrounding formations 112.

In some embodiments, the acoustic logging operating 100 may be a wireline operation, in which an acoustic logging device 120 is lowered into the well 114 via a wireline 122. In some embodiments, the wireline 122 is suspended from a wireline truck 102 parked at the well site 106. The wireline truck 102 may include a wireline spool 126 which supplies the wireline. The wireline truck 102 may also include a hoist 124 which suspends the wireline 122 and acoustic logging device 120 in the well 114. In some embodiments, the wireline 122 may be suspended by various other well site structures such as a rig.

In some embodiments, the acoustic logging device 120 is configured to emit acoustic signals 130 to the wellbore wall 115 and through the formation 112 and detect the returning acoustic data signal 132. The returning acoustic data signal 132 is altered from the original acoustic signal 130 based on the mechanical properties of the formation, such as compressional velocity, shear velocity, and the like. Thus, the acoustic data signal 132 carries this data and can be filtered and/or processed to obtain the formation data.

Figure 2:
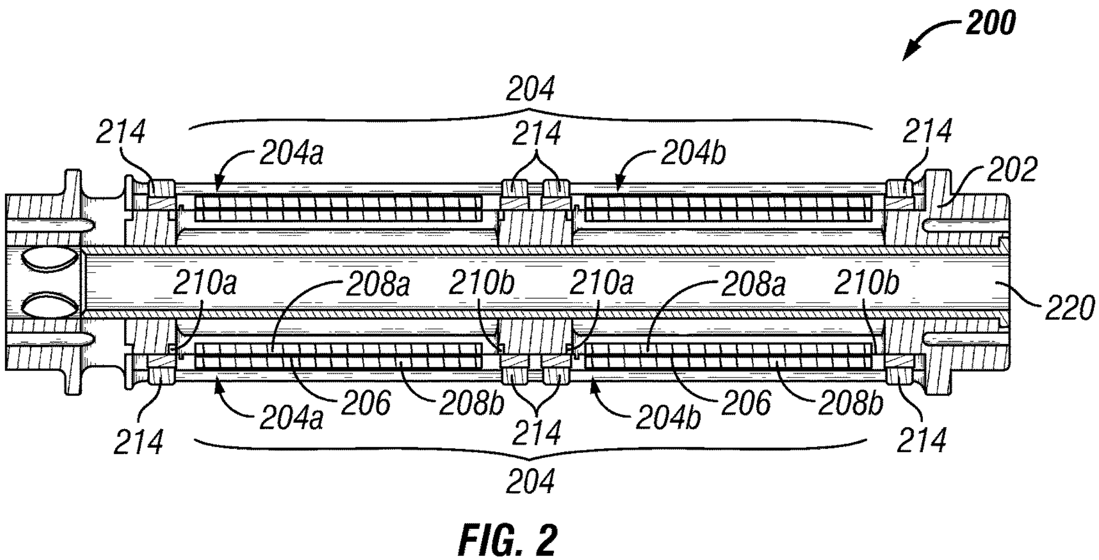
FIG. 2 is a lateral cross-sectional view of an internal structure of an acoustic logging device, in accordance with example embodiments of the present disclosure.
Figure 4:
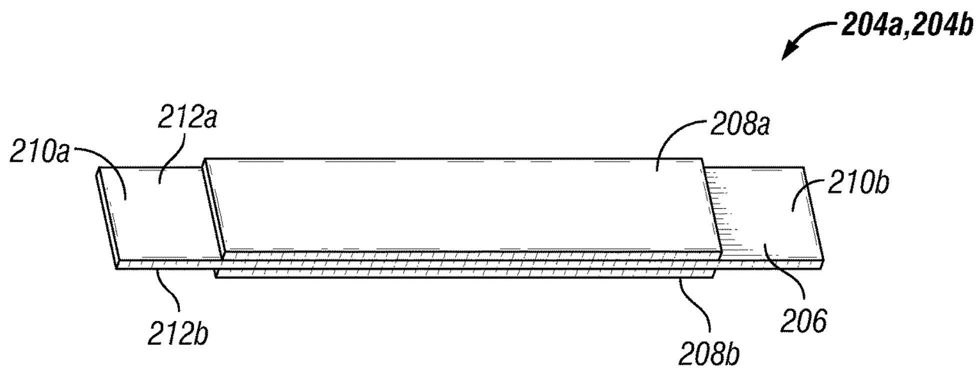
FIG. 4 is a detailed view of an acoustic transducer, in accordance with example embodiments of the present disclosure.

FIG. 2 illustrates an internal structure 200 of the acoustic logging device 120, in accordance with example embodiments of the present disclosure. In some example embodiments, the internal structure 200 includes a support structure 202 and a set of acoustic transducers 204 coupled to the support structure 202. In some embodiments, the set of acoustic transducers 204 includes a first acoustic transducer 204*a* and a second acoustic transducer 204*b*. In some embodiments, the first and second acoustic transducers 204*a*, 204*b* face the same direction, meaning that the first and second acoustic transducers 204*a*, 204*b* are configured to emit acoustic signals which propogate in the same direction. FIG. 4 illustrates a detailed view of the acoustic transducers 204, 204*b*.

Referring to FIGS. 2 and 4, in some example embodiments, each of the first and second acoustic transducers 204*a*, 204*b* includes a substrate 206. The substrate 206 includes a first end 210*a*, a second end 210*b*, a first side 212*a*, and a second side 212*b*. The first and second ends 210*a*, 210*b* of the substrate 206 can also be referred to as the first and second ends 210*a*, 210*b* of the acoustic transducers 204*a*, 204*b*. In the illustrated embodiment, the substrate 206 has a flat and elongated rectangular geometry. In other embodiments, the substrate 206 may have any other geometric or non-geometric shapes. In one embodiment, the substrate 206 is fabricated from brass. In other embodiments, the substrate 206 can be fabricated form various appropriate materials, such as steel, titanium, copper, among others.

Each of the acoustic transducers 204*a*, 204*b* further includes a first piezoelectric element 208*a* and a second piezoelectric element 208*b*. The first piezoelectric element 208*a* is coupled to the first side 212*a* of the substrate 206 and the second piezoelectric element 208*b* is coupled to the second side 212*b* of the substrate 206 such that the substrate 206 is disposed between the first and second piezoelectric elements 208*a*, 208*b*. In some embodiments, the first and second piezoelectric elements 208*a*, 208*b* have the same width as the substrate 206 and are shorter than the substrate 206 such that the first and second ends 210*a*, 210*b* of the substrate 206 extend beyond the first and second piezoelectric elements 208*a*, 208*b*. In some embodiments, the first and second piezoelectric elements 208*a*, 208*b* are aligned with each other.

The piezoelectric elements 208*a*, 208*b* of the acoustic transducers share an electrical ground where coupled to the substrate 206. When the same AC voltage is applied to the piezoelectric elements 208*a*, 208*b*, the first piezoelectric element 208*a* may contract while the second piezoelectric element 208*b* expends, or vice versa, due to piezoelectric stresses induced by the applied voltage. This causes vibration or back and forth arcing of the acoustic transducers 204*a*, 204*b*, each of which generates an acoustic output.

Referring to FIG. 2, each of the first and second acoustic transducers 204*a*, 204*b* is fixed to the support structure 202 by the first and second ends 210*a*, 210*b* of the substrates 206. The piezoelectric elements 208*a*, 208*b* are not fixed to the support structure and are free to resonate. In some embodiments, the ends 210*a*, 210*b* of the substrate 206 are fixed to the support structure via pins 214, clamps, or the like. Thus, the acoustic transducers 204*a*, 204*b* are free to resonate between the fixed ends. In some embodiments, the first and second acoustic transducers 204*a*, 204*b* are disposed next to one another longitudinally, such that when orientated as such, the distance from the first end 210*a* of the first acoustic transducer 204*a* to the second end 210*b* of the second acoustic transducer 204*b* is at least as great as the combined length of the first acoustic transducer 204*a* and the second acoustic transducer 204*b*. In certain other embodiments, the first and second acoustic transducers 204*a*, 204*b* are disposed next to each other laterally. In some embodiments, the first and second acoustic transducers 204*a*, 204*b* are parallel and on the same plane. In some embodiments, the first and second acoustic transducers 204*a*, 204*b* face the same direction. In some embodiments, the logging device 120 includes co-located X and Y dipoles.

In some embodiments, the first and second acoustic transducers 204*a*, 204*b* can be identical. In such embodiments. The first and second acoustic transducers 204*a*, 204*b* have the same resonance frequencies. Thus, the totally acoustic pressure output from the set of acoustic transducers 204 is the sum of the acoustic pressure output of each of the first and second acoustic transducers 204*a*, 204*b*.

In some embodiments, the first and second acoustic transducers 204*a*, 204*b* can have slightly different size parameters, such as different substrate lengths, widths, or thicknesses. Such variations may create an offset between the resonance frequencies of the first and second acoustic transducers 204*a*, 204*b*. In such embodiments, when excited with the same voltage, the acoustic output frequencies of the first and second acoustic transducers 204*a*, 204*b* are offset. Thus, the combination of the respective acoustic outputs is spread across a small frequency range and the total acoustic pressure output is relatively smoother around the resonant frequencies due to the superposition effect.

In some embodiments, the substrate lengths, widths, or thicknesses can vary up to 40%. In some embodiments, the first and second acoustic transducers 204*a*, 204*b* are configured to generate acoustic outputs between 1-1.5 kHz at approximately 200 Pa/kV combined. In some embodiments, the first and second acoustic transducers 204*a*, 204*b* to generate significant combined acoustic outputs between 1-4 kHz. In some embodiments, the frequency of the first acoustic output generated by the first acoustic transducer 204*a* and the second acoustic transducer 204*b* differ up to 2 kHz. In other embodiments, the first and second acoustic transducers are configured to generate acoustic outputs of lower or higher frequencies and/or with various amounts of offset.

Figure 5:
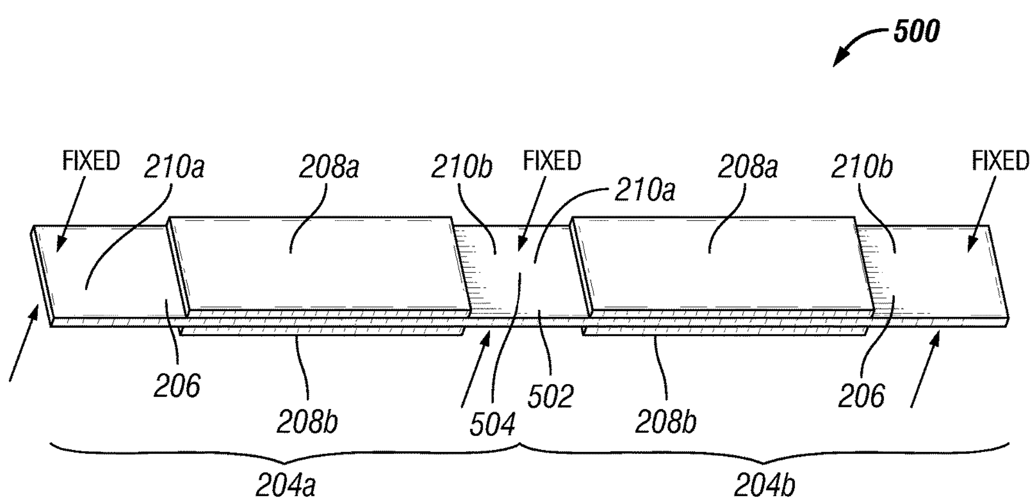
FIG. 5 illustrates a set of acoustic transducers in which the substrates of the acoustic transducers are integral and continuous, in accordance with example embodiments of the present disclosure.

FIG. 5 illustrates a set of acoustic transducers 500 in which the substrates 206 of the acoustic transducers are integral and continuous, in accordance with example embodiments of the present disclosure. Specifically, in certain such embodiments, the second end 210*b* of the substrate 206 of the first acoustic transducer 204*a* is coupled to or integral with the first end 210*a* of the substrate 206 of the second acoustic transducer 204*b*. In other words, the substrates 206 of the first and second acoustic transducers 204*a*, 204*b* can be one long substrate 502 that serves as the substrate 206 of the first and second acoustic transducers 204*a*, 204*b*. The portion of the long substrate 502 where the second end 210*b* of the first acoustic transducer 204*a* meets the first end 210*a* of the second acoustic transducer 204*b* can be called a mid-portion 504. In some embodiments, the first end 210*a* of the first acoustic transducer 204*a* and the second end 210*b* of the second acoustic transducer 210*b* are fixed to the support structure 202 and the mid-portion 504 is fixed to the support structure 202. Thus, resonance of the first acoustic transducer is isolated from the second acoustic transducer and vice versa. As such, the first and second acoustic transducers 204*a*, 204*b* resonate and generate acoustic output independently.

In some embodiments, the set of acoustic transducers 204 can include more than two acoustic transducers, each of which is fixed to the support structure 202 at its ends. In some embodiments, all the acoustic transducers in a particular set of transducers can be formed on the same substrate, such as illustrated in FIG. 5, in which the substrate is exposed (e.g., not covered by piezoelectric material) between each acoustic transducer and fixed to the support structure. Each independently resonating portion is considered a distinct acoustic transducer.

Figure 3:
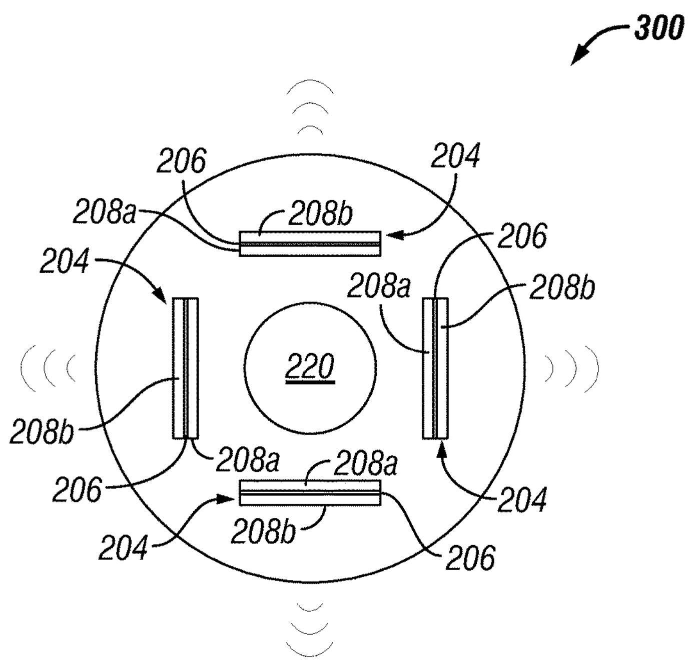
FIG. 3 is an axial cross-sectional view of an acoustic logging tool, in accordance with example embodiments of the present disclosure.

In certain example embodiments, the acoustic logging tool 120 includes a plurality of sets of acoustic transducers 204 configured to propagate acoustic outputs in various directions in order to obtain the mechanical properties of various portions of the well. FIG. 3 illustrates an axial cross-sectional view of an acoustic logging tool 300, in accordance with example embodiments of the present disclosure. In the illustrated embodiment, the logging tool 300 includes four sets of acoustic transducers 204 configured to propagate in four different directions. In some embodiments, the acoustic logging tool is a logging while drilling device and part of a bottom-hole assembly of a drill string. In such embodiments, the acoustic logging tool may include flowbore 220. In other embodiments, the logging tool 300 may not include the flowbore. 220

In addition to the embodiments described above, many examples of specific combinations are within the scope of the disclosure, some of which are detailed below:

An acoustic logging tool including a support structure a set of acoustic transducers coupled to the support structure, the set of acoustic transducers comprising a first acoustic transducer and a second acoustic transducer facing the same direction. Each of the first and second acoustic transducers may include a substrate having a first end, a second end, a first side, and a second side, a first piezoelectric element coupled to the first side, and a second piezoelectric element coupled to the second side. The first and second ends of the substrate extend beyond the first and second piezoelectric elements and are fixed to the support structure. The substrate of the first acoustic transducer and the substrate of the second acoustic transducer may be integral and continuous. The second end of the substrate of the first acoustic transducer may be integrally coupled to the first end of the substrate of the second acoustic transducer, forming a substrate joint portion. Also, the first end of the substrate of the first acoustic transducer and the second end of the substrate of the second acoustic transducer may be on opposite sides of the substrate joint portion. The substrate joint portion may be fixed to the support structure. The first acoustic transducer and the second acoustic transducer may be longitudinally aligned. The first acoustic transducer may be longer than the second acoustic transducer. The substrate of the first acoustic transducer may be thicker than the substrate of the second acoustic transducer. The acoustic logging tool may also have a flowbore formed therethrough. The acoustic logging tool may also have a plurality of sets of acoustic transducers, each of the plurality of sets of acoustic transducers facing a different direction.

In certain embodiments, an acoustic logging tool, may include a support structure and a dual acoustic transducer. The dual acoustic transducer may include a substrate comprising a first side, a second side, a first end, a second end, and a mid-portion between the first end and the second end. The first end, second end, and mid-portion may be fixed to the support structure. The dual acoustic transducer may also include a first piezoelectric element coupled to the first side of the substrate between the first end and the mid-portion; a second piezoelectric element coupled to the second side of the substrate between the first end and the mid-portion; a third piezoelectric element coupled to the first side of the substrate between the mid-portion and the second end; and a fourth piezoelectric element coupled to the second side of the substrate between the mid-portion and the second end. The first and second piezoelectric elements may be the same size and aligned with each other, and the third and fourth piezoelectric elements are the same size and aligned with each other. In an embodiment, vibration of the substrate due to the first and second piezoelectric elements is isolated between the first end and the mid-portion, and vibration of the substrate due to the second and third piezoelectric elements is isolated between the third and fourth piezoelectric elements is isolated between the mid-portion and the second end. The distance between the first end and the mid-portion is longer than the distance between the mid-portion and the second end. The the first and second piezoelectric elements may be larger than the third and fourth piezoelectric elements by up to 40%. The acoustic logging tool may include co-located X and Y dipoles.

The disclosed embodiments may include a method of performing acoustic logging. The method may include energizing a first acoustic transducer; energizing a second acoustic transducer, wherein each of the first and second acoustic transducers comprise a substrate, a first piezoelectric element coupled to a first side of the substrate, and a second piezoelectric element coupled to a second side of the substrate; emitting a first acoustic signal from the first acoustic transducer; and emitting a second acoustic signal from the second acoustic transducer in the same direction as the first acoustic signal. The first acoustic signal and second acoustic signal may have frequencies within 2 kHz of each other. The the first acoustic transducer and the second acoustic transducer may be formed on different portions of a single substrate. The first acoustic transducer may be longitudinally aligned with the second acoustic transducer. The method may include applying the same voltage to the first and second acoustic transducers.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

We claim:

1. An acoustic logging tool, comprising:

a support structure;

a set of acoustic transducers coupled to the support structure, the set of acoustic transducers comprising a first acoustic transducer and a second acoustic transducer facing the same direction;

a substrate having a first end, a second end, a first side, and a second side; and a substrate joint portion between the first acoustic transducer and the second acoustic transducer, wherein the substrate joint portion is fixed to the support structure, wherein each of the first and second acoustic transducers comprises:

a first piezoelectric element coupled to the first side; and a second piezoelectric element coupled to the second side, wherein the first and second ends of the substrate extend beyond the first and second piezoelectric elements and are fixed to the support structure.

2. The acoustic logging tool of claim 1, wherein the substrate of the first acoustic transducer and the substrate of the second acoustic transducer are integral and continuous.

3. The acoustic logging tool of claim 1, wherein the first acoustic transducer and the second acoustic transducer are longitudinally aligned.

4. The acoustic logging tool of claim 1, wherein the first acoustic transducer is longer than the second acoustic transducer.

5. The acoustic logging tool of claim 1, wherein the substrate of the first acoustic transducer is thicker than the substrate of the second acoustic transducer.

6. The acoustic logging tool of claim 1, comprising a flowbore formed therethrough.

7. The acoustic logging tool of claim 1, comprising a plurality of sets of acoustic transducers, each of the plurality of sets of acoustic transducers facing a different direction.

8. An acoustic logging tool, comprising:
- a support structure; and
- a dual acoustic transducer comprising:
- a substrate comprising a first side, a second side, a first end, a second end, and a mid-portion between the first end and the second end, wherein the first end, second end, and mid-portion are fixed to the support structure;
- a first piezoelectric element coupled to the first side of the substrate between the first end and the mid-portion;
- a second piezoelectric element coupled to the second side of the substrate between the first end and the mid-portion;
- a third piezoelectric element coupled to the first side of the substrate between the mid-portion and the second end; and
- a fourth piezoelectric element coupled to the second side of the substrate between the mid-portion and the second end.

9. The acoustic logging tool of claim 8, wherein the first and second piezoelectric elements are the same size and aligned with each other, and the third and fourth piezoelectric elements are the same size and aligned with each other.

10. The acoustic logging tool of claim 8, wherein vibration of the substrate due to the first and second piezoelectric elements is isolated between the first end and the mid-portion, and vibration of the substrate due to the second and third piezoelectric elements is isolated between the third and fourth piezoelectric elements is isolated between the mid-portion and the second end.

11. The acoustic logging tool of claim 8, wherein the distance between the first end and the mid-portion is longer than the distance between the mid-portion and the second end.

12. The acoustic logging tool of claim 9, wherein the first and second piezoelectric elements are larger than the third and fourth piezoelectric elements by up to 40%.

13. The acoustic logging tool of claim 8, further comprising co-located X and Y dipoles.

14. A method of performing acoustic logging, comprising:
- energizing a first acoustic transducer coupled to a substrate on a first end from a substrate joint portion;
- energizing a second acoustic transducer coupled to the substrate on a second end from the substrate joint portion, wherein each of the first and second acoustic transducers comprise a first piezoelectric element coupled to a first side of the substrate, and a second piezoelectric element coupled to a second side of the substrate, and the substrate joint portion is fixed to a support structure;
- emitting a first acoustic signal from the first acoustic transducer; and
- emitting a second acoustic signal from the second acoustic transducer in the same direction as the first acoustic signal.

15. The method of claim 14, where the first acoustic signal and second acoustic signal have frequencies within 2 kHz of each other.

16. The method of claim 14, wherein the first acoustic transducer and the second acoustic transducer are formed on different portions of a single substrate.

17. The method of claim 14, wherein the first acoustic transducer is longitudinally aligned with the second acoustic transducer.

18. The method of claim 14, comprising applying the same voltage to the first and second acoustic transducers.

* * * * *